(12) United States Patent
Le Houerou et al.

(10) Patent No.: US 9,794,534 B2
(45) Date of Patent: Oct. 17, 2017

(54) IMAGE PROCESSING METHODS, AND IMAGE PROCESSING DEVICES AND SYSTEM FOR A SCALABLE MULTI-PROJECTION SYSTEM

(71) Applicant: CANON KABUSHIKI KAISHA, Tokyo (JP)

(72) Inventors: Brice Le Houerou, Acigne (FR); Falk Tannhauser, Rennes (FR); Tristan Halna Du Fretay, Langan (FR); Arnaud Closset, Cesson-Sevigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 14/537,665

(22) Filed: Nov. 10, 2014

(65) Prior Publication Data

US 2015/0138042 A1    May 21, 2015

(30) Foreign Application Priority Data

Nov. 12, 2013   (GB) .................................... 1319931.0

(51) Int. Cl.
*H04N 9/31* (2006.01)
*G03B 21/14* (2006.01)
(Continued)

(52) U.S. Cl.
CPC ........... *H04N 9/3147* (2013.01); *G03B 21/14* (2013.01); *H04N 21/4122* (2013.01);
(Continued)

(58) Field of Classification Search
None
See application file for complete search history.

(56) References Cited

U.S. PATENT DOCUMENTS 6,804,406 B1 * 10/2004 Chen ..................... G06T 3/4038
345/1.3
2008/0036971 A1    2/2008 Hasegawa
(Continued)

OTHER PUBLICATIONS

Stephen Procter, Patents Act 1977: Search Report under Section 17, report, Apr. 28, 2014, 3 pages, Application No. GB1319931.0, Intellectual Property Office, Newport, South Wales, United Kingdom.

*Primary Examiner* — Jennifer Mehmood
*Assistant Examiner* — Parul Gupta
(74) *Attorney, Agent, or Firm* — Canon USA, Inc. I.P. Division

(57) ABSTRACT

An image processing device processes a first sub-image of an image split into sub-images. Each sub-image is displayable by a display device. The image processing device is associated with a first display device and connects to a source device through a first network and to another image processing device through a second network. The image processing device includes first and second receiving units and a generating unit. The first receiving unit receives the first sub-image from the source device via the first network. The second receiving unit receives, via a second network, at least one part of at least one second sub-image to be displayed by another display device, wherein the received at least one part is adjacent to the received first sub-image. The generating unit generates a first clustered sub-image to be displayed by the first display device, based on the received first sub-image and adjacent part.

29 Claims, 4 Drawing Sheets

(51) Int. Cl.
*H04N 21/41* (2011.01)
*H04N 21/436* (2011.01)
*H04N 21/4402* (2011.01)
*H04N 21/442* (2011.01)

(52) U.S. Cl.
CPC . *H04N 21/43615* (2013.01); *H04N 21/44227* (2013.01); *H04N 21/440245* (2013.01); *H04N 21/440263* (2013.01)

(56) References Cited

U.S. PATENT DOCUMENTS

| | | | |
|---|---|---|---|
| 2008/0291863 A1* | 11/2008 | Agren | H04J 3/0632 370/315 |
| 2009/0315887 A1 | 12/2009 | Yamaguchi | |
| 2010/0118050 A1* | 5/2010 | Clodfelter | G06F 3/1446 345/621 |
| 2011/0037742 A1* | 2/2011 | Suh | G06F 3/1431 345/211 |
| 2011/0310354 A1 | 12/2011 | Fujimori | |
| 2014/0211168 A1* | 7/2014 | Yano | G06F 3/1431 353/30 |

\* cited by examiner

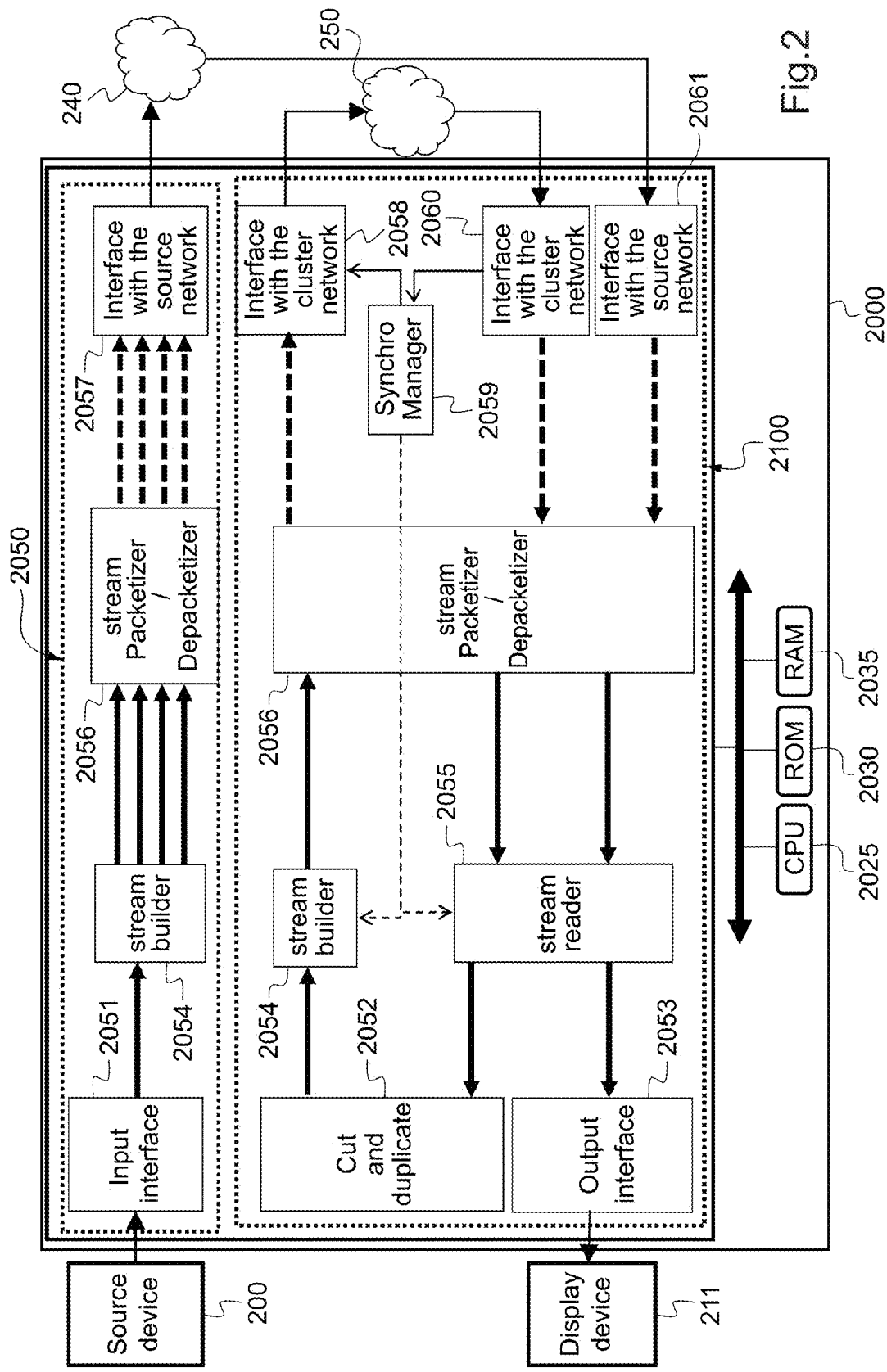

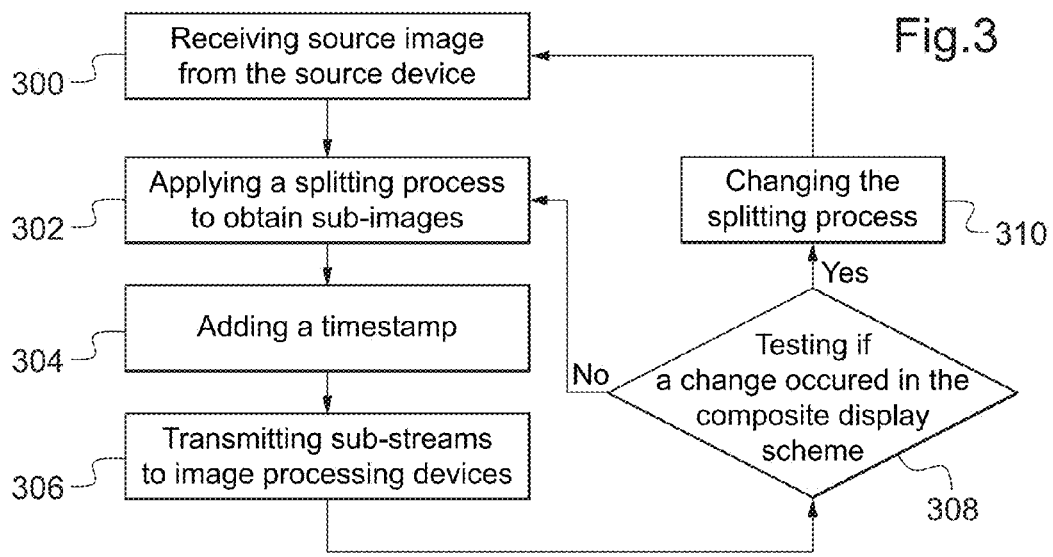
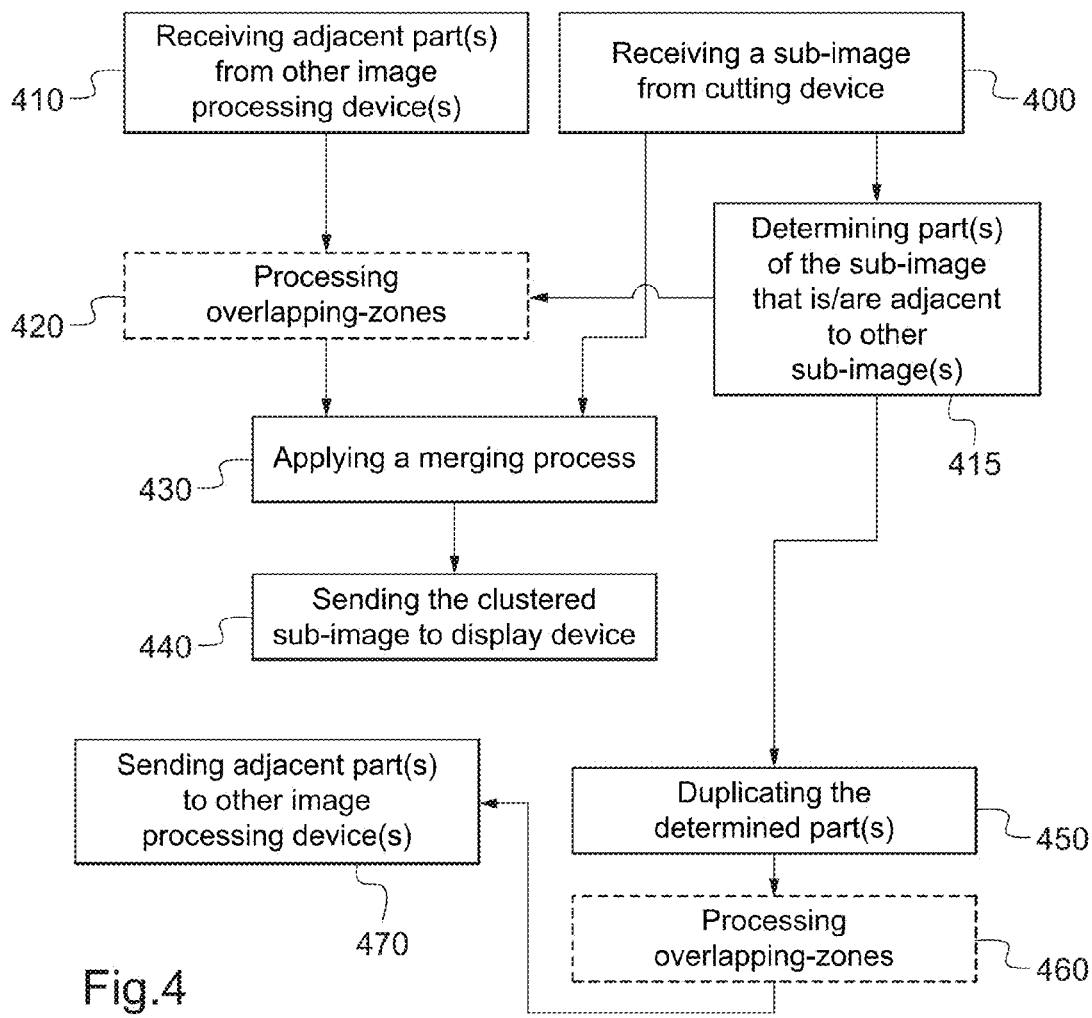

IMAGE PROCESSING METHODS, AND IMAGE PROCESSING DEVICES AND SYSTEM FOR A SCALABLE MULTI-PROJECTION SYSTEM

CROSS REFERENCE TO RELATED APPLICATIONS

This application claims the benefit under 35 U.S.C. §119 (a)-(d) of United Kingdom Patent Application No. 1319931.0, filed on Nov. 12, 2013 and entitled "Image processing methods, and Image processing devices and system for a scalable Multi-projection system". The above cited patent application is incorporated herein by reference in its entirety.

FIELD OF THE INVENTION

The present invention relates in general to video data transmission and in particular to multi-projection systems.

BACKGROUND OF THE INVENTION

Multi-projection systems (hereafter MP systems) are increasingly used, in particular in contexts where a very large display or projection area is required, for instance in a dome, a stadium or a concert hall, or for projection on buildings.

In practice, an MP system comprises an array of display devices, for instance of video projectors (VP) that each projects or displays a part (sub-image) of an image on a screen.

Usually, the different VPs cover adjacent, partially overlapping zones of the total screen area in order to ensure a smooth transition between different projected sub-images and provide a tolerance against small displacements which may be introduced, for example, by vibrations or by thermal expansion.

To that end, a blending process is performed to generate adapted overlapping zones. In practice, the blending process for a sub-image consists in duplicating pixels of edge areas of the surrounding sub-images of the considered sub-image.

The definition and the size of a projected image depend on the focal length of the VP lens, the size of the VP's light modulation device (e.g. an LCD panel) and the distance between the VP and the screen or display zone.

VPs are commonly equipped with zoom lenses (i.e. lenses with variable focal length) in order to provide the user with freedom to adapt VP installations to given spatial constraints, for example to select the distance between the VP and the screen.

Document US 2008/036971 proposes an MP system that aims at simplifying the installation setup based on the exchange of information relative to the composite display scheme between the VPs.

A transmission/reception section associated with a configuration is used, permitting for each VP to determine a specific cutting out of the original image to be displayed by the display device.

However, in this solution, each VP has to support the maximum video resolution of the original image. Consequently, the VP input interface depends on the video source resolution, thus making the composite display not really scalable.

Other solutions are known wherein different video streams, each comprising only the sub-image (and not the whole image) and the overlapping zones to be displayed by a corresponding VP are transmitted to each VP.

However, at the source server, the complexity of this solution increases with the number of VPs, since the same number of applications of the blending process are required. This solution thus also requires interfaces with a large bandwidth to send the sub-images together with the duplicated pixels.

There is a need to improve known multi-projection systems to allow an improved scalability and reduce the bandwidth requirements of the source server and of the display devices.

SUMMARY OF THE INVENTION

The present invention has been devised to address one or more of the foregoing concerns.

According to a first aspect of the present invention, an image processing device, for a multi-display system, is to process a first sub-image of an image split into a plurality of sub-images according to a display scheme, wherein each of the plurality of sub-images is configured to be displayed by a display device, wherein the image processing device is associated with a first display device and is configured to be connected to a source device through a first network and to at least one other image processing device through a second network. The image processing device includes a first receiving unit configured to receive the first sub-image from the source device via the first network, a second receiving unit configured to receive, via a second network, at least one part of at least one second sub-image to be displayed by another display device associated with the at least one other image processing device, wherein the received at least one part is adjacent to the received first sub-image, and a generating unit configured to generate a first clustered sub-image to be displayed by the first display device, based on the received first sub-image and the at least one received adjacent part.

Correspondingly, there is provided a method of processing a first sub-image of an image split into a plurality of sub-images according to a [composite] display scheme, each to be displayed by a display device, the method being carried out at an image processing device connected to a source device through a first network and to at least one other image processing device through a second network, said image processing device being associated with a first display device, the method comprising:

receiving from the source device, via the first network, the first sub-image;

receiving, via a second network, at least one part of at least one second sub-image to be displayed by another display device associated with said other image processing device, the received at least one part being adjacent to the received first sub-image; and generating a first clustered sub-image to be displayed by the first display device, based on the received first sub-image and the at least one received adjacent part.

The clustered sub-image finally displayed is thus composed of the sub-image received from the source device via the first network and adjacent parts from other sub-images (also called overlapping zones) received from other image processing devices via the second network.

Thus, over the first network, each image processing device receives its own sub-image to be displayed, and not the overlapping zones, that are received over the second network.

Consequently, no extra bandwidth is needed at the source side to transmit the duplicated pixels of the overlapping zones from the source device to image processing devices.

According to a second aspect of the invention, there is provided an image processing device for processing a first sub-image of an image split into a plurality of sub-images according to a [composite] display scheme, each to be displayed by a display device, the image processing device being connected to a source device through a first network and to at least one other image processing device through a second network, the image processing device being associated with a first display device and comprising:

a module for receiving from a source device, via the first network, the first sub-image;
 a module for determining at least one part of the received first sub-image, the at least one part being adjacent to at least one second sub-image received by at least one second image processing device; and
 a module for sending, via said second network, the at least one determined part to at least one of the second image processing device as a part of a second clustered sub-image to be displayed by another display device associated with the second processing device.

Correspondingly, there is provided a method of processing a first sub-image of an image split into a plurality of sub-images according to a [composite] display scheme, each to be displayed by a display device, the method being carried out at an image processing device connected to a source device through a first network and to at least one other image processing device through a second network, said image processing device being associated with a first display device, the method comprising:

receiving from a source device, via the first network, the first sub-image;
 determining at least one part of the received first sub-image, the at least one part being adjacent to at least one second sub-image received by at least one second image processing device; and
 sending, via said second network, the at least one determined part to at least one of the second image processing device as a part of a second clustered sub-image to be displayed by another display device associated with the second processing device.

The determination of overlapping zones (adjacent parts) to be projected by a given image processing device is thus performed by another image processing device and not at the source device side. The source device complexity is reduced since the processing of overlapping zones is not done at the source device side.

This is particularly advantageous since the image processing device determining the overlapping zones just duplicates a part of the sub-image received to be displayed by its corresponding display device.

Each associated image processing device associated to a display device only manages parts of its own sub-image (i.e. the sub-image to be displayed by the associated display device) that may be displayed also by other image processing devices as overlapping zones. The calculation of overlapping zones is thus distributed among the different image processing devices of the second network.

The invention also concerns an image processing device and corresponding method of processing, comprising the combined features of the first and second aspects aforementioned.

According to a third aspect of the invention, there is provided an image processing system for a multi-display system, for processing an image received from a source device, to be displayed by an array of display devices, the system comprising a cutting device configured to split the image received from the source device into a plurality of sub-images according to a [composite] display scheme and to send each sub-image, via a first network, to a different image processing device according as aforementioned.

Correspondingly, there is provided a method of processing an image received from a source device, to be displayed by an array of display devices, the method comprising:

splitting the image received from the source device into a plurality of sub-image according to a [composite] display scheme;
 sending each sub-image, via a first network, to a different image processing device as aforementioned.

The sub-image sent to a given image processing device is typically part of a clustered sub-image to be displayed by a display device associated with the given image processing device.

Regardless of the nature of the composite display scheme, the source device always sends the original image to the cutting device. The source device is thus independent from the number of display devices (i.e. the number of sub-images to be displayed) and independent from the composite display scheme.

Consequently, the present invention is easy to implement since it only requires connecting an image processing system, to the existing links between the source and the display devices.

Optional features of the invention are further defined in the dependent appended claims.

In an embodiment, the first receiving module may be configured to receive a first timestamp for the first sub-image received from the source device, and the second receiving module may be configured to receive at least one second timestamp for the at least one received adjacent part from the at least one other image processing device.

In an embodiment, the sending module may be configured to send, to the at least one other image processing device, a timestamp for the at least one determined part.

In an embodiment, the cutting device may be configured to generate a timestamp for each sub-image and to send it with the sub-image.

The timestamps allows synchronizing the display of the sub-images by the different display devices.

In an embodiment, the [composite] display scheme may be composed of sub-images of same size.

Otherwise, the [composite] display scheme may be composed of sub-images of different size.

Thanks to the invention, various types of display scheme may be handled without need to adapt the source device. Good scalability of the whole multi-projection system is thus achieved.

Since the present invention may be implemented in software, the present invention may be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 2 schematically shows a possible architecture for an image processing system in an MP system according to embodiments of the present invention;

FIG. 3 shows general steps of a processing method for splitting an image into sub-images to be displayed by an array of display devices of an MP system, according to embodiments of the invention;

FIG. 4 shows general steps of a processing method for processing a sub-image to be displayed by a given display device, according to embodiments of the invention.

DETAILED DESCRIPTION OF EMBODIMENTS OF THE INVENTION

Figure 1A:
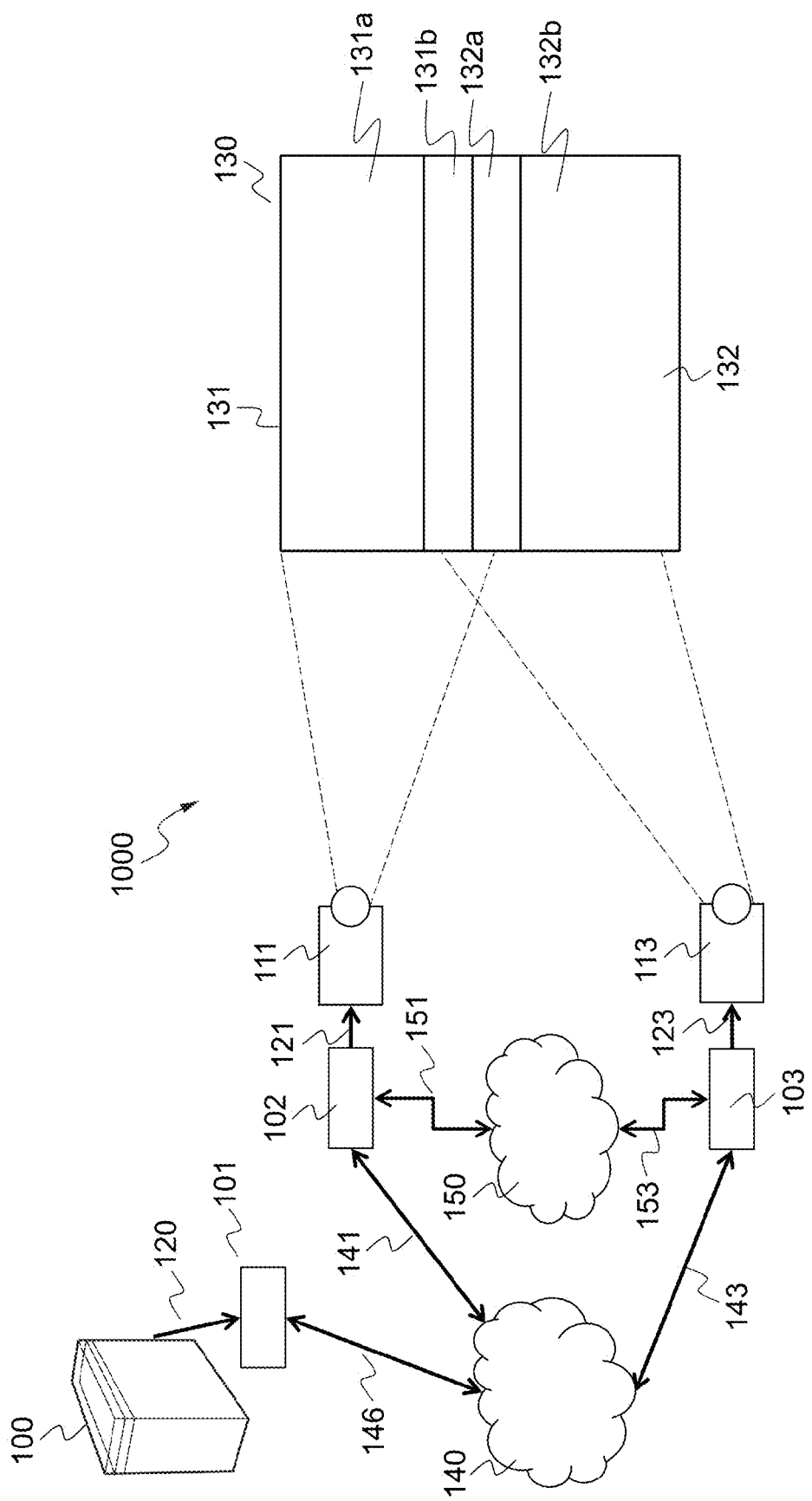
FIG. 1 is composed of FIG. 1a and FIG. 1 b that respectively show an MP system for displaying an image, and the effects of processing performed by the devices of FIG. 1a on an original image, according to embodiments of the invention.
Figure 1B:
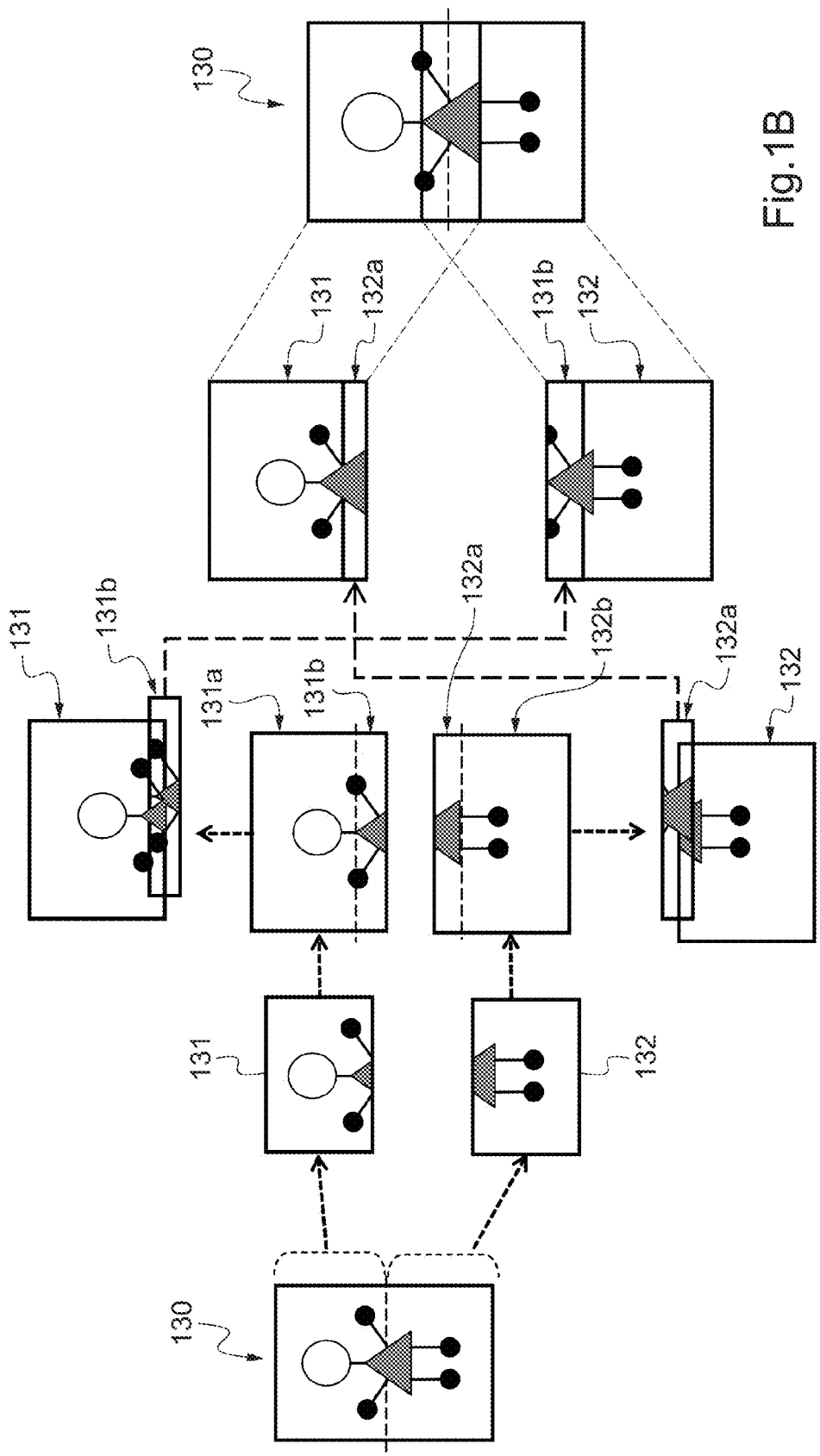

FIG. 1 is composed of FIG. 1a that shows a connection view of devices of a scalable MP system 1000 according to the invention, and FIG. 1b that shows the effects of processing performed by the different devices of FIG. 1a on the original image 130, in terms of image data.

The MP system 1000 comprises a source device 100, for example a digital video camera, a hard-disk or solid-state drive, a digital video recorder, a personal computer, a set-top box, a server, a video game console or the like.

The source device 100 is connected to a cutting device 101, by means of, for instance, an HDMI or DisplayPort connection 120. In another embodiment, the cutting device 101 may be linked to the source device 100 by wireless means.

The cutting device is connected to a first network 140 named source network, to which image processing devices 102, 103, are also connected, by cables or wireless means (links 146, 141, and 143).

For instance, the source network may be a 60 GHz wireless network, or a multi-gigabit Ethernet network, or a video distribution system using high definition video cables such as DisplayPort, HDMI, DVI or SDI.

Also, the image processing devices 102, 103, are connected to a second network 150 named cluster network, by cables or wireless means (links 151 and 153). This cluster network allows the image processing devices 102, 103, to exchange data between them.

For instance, the cluster network may be a 60 GHz wireless network, or a multi-gigabit Ethernet network, or a video distribution system using high definition video cables like DisplayPort, HDMI, DVI or SDI.

The source network and the cluster network may use the same or different network technologies. In both cases, the channels between the cutting device and the image processing devices are always distinct from the channels between a given image processing device and another one.

Each image processing device 102, resp. 103 is connected to a display device 111, resp. 113, by means of communications links 121, resp. 123. The display devices are for instance video projectors.

The aforementioned communications links (120, 121, 123, 141, 143, 146, 150, 153) represent different communications channels, either with cables or wireless. They may be physically different or logically different.

For instance, the communications at the source device (e.g. through links 141, 143, and 146) may be based on the DisplayPort technology (i.e. cables) while the communications between the image processing devices (e.g. through links 151 and 153) may be based on a 60 GHz wireless network with adjacent point-to-point communications (allowing for example a bandwidth of 7 Gbits/s per channel) using beam forming antenna technology.

As another example, the communications at the source device may be based on the aforementioned 60 GHz wireless technology while the communications between the image processing devices may use cables.

Although the example described here is for only two display devices, the present invention is not limited thereto. The person skilled in the art may consider other configurations with more display devices and apply the teachings described here in the case of two display devices.

The functioning of the different aforementioned devices is now described.

The source device 100 is configured to generate data representing a source image to be displayed for example on a screen (not shown) by the MP system 1000, as a full image 130. The source image may be from a sequence of images (video). The present invention may be used in a context of transmission of video data. The source device 100 is also configured to send such an image to the cutting device 101.

Thus, the cutting device 101 is configured to receive the source image from the source device 100. It is also configured to split the received source image into a plurality of sub-images (here, two: 131, 132), according to a display scheme. The plurality of sub-images is to be displayed as the full image 130 by the MP system 1000, by means of the display devices 111, 113.

In the example of FIG. 1a, and as can be seen in detail in FIG. 1 b, the display scheme comprises cutting up the source image into two sub-images of the same size, 131 and 132. In a variant, the display scheme may involve an asymmetric cutting up.

The cutting device 101 is also configured to transmit the sub-image 131 to the image processing device 102 associated with the display device 111, and the sub-image 132 to the image processing device 103 associated with the display device 113.

The display scheme also gives information about which sub-image should be sent to which image processing device. The display scheme may depend on the technology used by the source network 140. It may also depend on the resolution of the display devices 111, 113.

For example, the cutting device may have one input port and four output ports. In that case, the cutting device may split the source image in four sub-parts (e.g. up left, up right, down left and down right), each sub-part corresponding to a tile of the source image. The pixels of each tile are output through one of the output ports, and no pixel is sent twice or more.

According to embodiments of the invention, and as will be described below, the cutting device is not configured to perform any duplication of image pixels. Thus, the cutting device 101 does not need to determine parameters for any blending processing, or to duplicate pixels of the source image, to generate data for overlapping zones, as it is required in an MP system of the state of art. In other words, the cutting device 101 is configured to transmit the sub-images as split, without additional data.

The cutting device processes the source image only in view of its distribution via its several ports. Thus, the input bandwidth of the source image is equal to the sum of the output bandwidth of the sub-images.

Consequently, no extra bandwidth is needed at the source since there is no transmission to the image processing devices of duplicated pixels corresponding to overlapping zones.

In order to synchronize the display of the sub-images between the display devices 111 and 113, the cutting device 101 may transmit its local time value to the image processing devices 102 and 103, as a time reference for the whole MP system. Each image processing device of the MP system may thus adjust its local time in phase with the received one.

The cutting device 101 may be configured to include, for each sub-image, a timestamp value in each sub-stream, indicating at what time the corresponding sub-image, and so the full image 130, has to be displayed.

In particular, the timestamp indicates at what time the image processing device has to transmit the received sub-image to its associated display device. In practice, the sub-image is thus transmitted when the local time of the image processing device reaches the timestamp value received with the sub-image.

For example, in case the MP system uses a synchronous transmission scheme such as TDMA, it is known that the sub-images are transmitted to the respective image processing devices with a fixed maximum latency L (representing image propagation delay). Thus, the timestamp value inserted by the cutting device 101 may be equal to the sum of the latency L and of its local time at reception of the source image from the source device 100.

The image processing devices 102 and 103 are each configured to receive via the source network 140, their own sub-image 131 and respectively 132 to be displayed by their associated display devices 111, 113.

According to embodiments, the image processing devices 102 and 103 may also be configured to determine at least one part of their own sub-image that is adjacent to other sub-images (received by other image processing devices) based on the display scheme. These determined parts of the sub-images may be used for performing an edge blending process to determine zones that will overlap with other sub-images when being projected.

For instance, on FIG. 1b, the rectangular part 131b of the sub-image 131 received by the image processing device 102 is determined to be at the edge of the other sub-image 132 received by the image processing device 103.

In such embodiments, the image processing device (102, resp. 103) is configured to duplicate at least the determined parts (131b, resp. 132a on FIG. 1b) of its respective sub-image (131, resp. 132) and send it/them to each other image processing device that needs it (103, resp. 102), via the cluster network 150.

In some embodiments, the whole sub-image may be duplicated but only the duplicated determined parts are sent.

The image processing device may be configured so that another timestamp is transmitted with the determined part in order to simplify the synchronization of the sub-image received via the source network 140 and the adjacent part received from the cluster network 150. That other timestamp may be based on the local time at the sending image processing device.

For instance, in case of the cluster network is based on a Time Multiplexing Method Access, the image processing devices can be synchronized using a beacon mechanism of the cluster network as a time reference. In this case, this time reference associated to a constant latency allows keeping a same latency for sub-images processing in each image processing device.

The determination and the transmission of overlapping zones (adjacent parts) to be projected by a given image processing device (e.g. 103) is thus performed by another image processing device (e.g. 102), at the image processing devices, and not at the source device. Therefore, source device complexity is reduced in comparison with the state of art.

The image processing device 103 (resp. 102) may be configured so that upon receiving the adjacent part 131b (resp. 132a) from the image processing device 102 (resp. 103), the image processing device may generate a clustered sub-image based on the sub-image 132 (resp. 131) received via the source network 140 and the received adjacent part 131b (resp. 132a). The generation of the clustered sub-image (or clustering) consists in making a combination of the sub-image 132 (resp. 131) and the received sub-parts 131b (resp. 132a) that are adjacent to the sub-image 132 (resp. 131).

The clustering (i.e. the generation of the clustered sub-image) may use the aforementioned different received timestamps to render a seamless display.

Consequently, in this example, the clustered sub-image to be displayed by the display device 113 is composed of the sub-image 132 from the source network 140 and the part 131b received from the image processing device 102 via the cluster network 150.

Correspondingly, the image processing device 102 receives the adjacent part 132a via the cluster network 150. The sub-image 131 and the part 132a are then combined to generate a clustered sub-image to be displayed by the display device 111.

As explained above, the clustered sub-images should be delivered synchronously to each display device, for example, in case of synchronous transmission scheme, when the common time reference (once the local time of each image processing device has been adapted to the local time of the cutting device) in each image processing device has reached a constant value.

For example, the propagation delay or latency may be equal to the period of two image frames (e.g. 2×17 ms for a 60 frames per second MP system).

When displayed, the clustered sub-images 131+132a and 132+131b (FIG. 1b) have overlapping zones in common: the parts 131b and 132a are both projected several times (here two times).

For that reason, these parts projected several times have to be further processed to decrease their intensity. In practice, they may be processed so as to divide their intensity depending on how many times these parts will be projected. In the example of FIGS. 1a and 1b, the intensity may be for example divided by two.

That further processing may be performed during the determination of overlapping zones (as aforementioned) so that the determined part has already a decreased intensity when it is received. In a variant, that further processing may be performed during the clustering (i.e. generation) into a clustered sub-image to be displayed. Typically, when parts of a current sub-image are being determined, they may also be processed in the image processing device so that the sub-image is ready to be projected, in terms of intensity.

For instance, the determined parts 131b and 132a of respective sub-images 131 and 132 may be processed in the image processing device implementing the determination of these parts so that the superposition of these determined parts when the different clustered sub-images are displayed is smooth (i.e. the intensity of the overlapping zones is quite similar to the intensity of a given sub-image).

In a configuration where there are more than two display devices, with a display scheme cutting the source image into equally sized sub-images, some overlapping zones may be displayed more than two times. In that case, the zones concerned should be processed so that their intensity is adapted to the sub-image parts displayed only once.

The displayed image 130 resulting from the synchronized display of the clustered sub-images is thus smooth in terms of intensity.

Generally speaking, the use of the source network 140 and the cluster network 150 for dispatching the transmission of different data allows simplifying the requirements of the devices in particular in terms of bandwidth interface.

Indeed, the source network 140 is dedicated to an efficient distribution of sub-images to each image processing device attached to a display device, without considering any specific processing required by the MP system (e.g. blending processing for generating overlapping zones).

The source network 140 bandwidth usage may thus be equivalent to the source device bandwidth, since only sub-images are sent through it, and no duplicated pixels.

The required bandwidth of the source network interface of the image processing devices may thus be equivalent to the original resolution bandwidth.

In fact, the source network bandwidth is the same whatever is the number of display devices, the resolution of the display devices or the overlapping zones parameters.

Additionally, the cluster network 150 is dedicated to the exchange of sub-parts of sub-images between image processing devices having one or more overlapping zone(s) in common.

Consequently, the required cluster network bandwidth depends on the number of overlapping zones. The cluster network interface bandwidth of the processing devices may be limited to the native resolution bandwidth of the attached display device.

FIG. 2 shows a possible architecture for an image processing system in an MP system (e.g. the MP system 1000 of FIG. 1a), according to one aspect of the present invention.

The image processing system 2000 is configured to process an image from a source device 200 (similar to the source device 100 of FIG. 1a), to be displayed by an array of display devices. Here, only one display device 211 is represented and described in detail. However, the invention applies to two or more display devices, of which the operation is similar to that which will be described with reference to the display device 211.

The source device 200 generates image data, for example from a sequence of images (video) to be displayed by the MP system, in particular by the display device 211 (similar to display devices 111 and 113 of FIG. 1). The source device 200 may be connected to the image processing system 2000, for example by wireless means or by cables.

The image processing system 2000 comprises a cutting module for splitting a source image into sub-images, and two or more image processing modules for processing each sub-image. The cutting module and the image processing module may be hardware modules or devices, each comprising a processing unit and volatile and non-volatile memories.

In a variant, these modules may be of software type (or a combination of hardware and software), running on a common processing unit CPU 2025 configured to execute programs of parts of programs according to embodiments of the present invention, using a volatile memory RAM 2035 configured to store any variable data and a non-volatile memory ROM 2030 that may be configured to store the programs. The ROM 2030 may constitute a computer-readable storage medium according to one aspect of the present invention.

Hereafter, the words "cutting device" and "image processing device" are used to designate both situations (software and/or hardware modules).

The cutting device 2050 comprises an input interface 2051 configured to receive the source image from the source device 200.

Regardless of the nature of the composite display scheme, the source device always sends the whole source image to the image processing system 2000. In other words, the source device is independent from the number of display devices (i.e. the number of sub-images). This makes embodiments of the present invention easy to implement since there is no need to adapt the source device to the display scheme.

The cutting device 2050 may also comprise a stream builder 2054 that splits the received source image into sub-images, and generates different sub-streams, each containing unique pixels corresponding to a different sub-image. A timestamp may also be added for the synchronization of the display of the different sub-images by the display devices, as explained with reference to FIG. 1a.

The cutting device 2050 may also comprise a stream packetizer/depacketizer 2056 configured to transform the sub-streams into a form adapted to their transmission (i.e. into packets) on the source network 240, by an interface 2057.

Each sub-stream is then received by a different image processing device 2100. For the sake of clarity, only one of them is represented on FIG. 2. However, the invention applies to two or more image processing devices.

The image processing device 2100 is similar to image processing devices 102 and 103 of FIG. 1a. In particular, the image processing device 2100 comprises an interface with the source network 2061, and the stream packetizer/depacketizer 2056 for transforming the received packets into a sub-stream corresponding to a sub-image.

In parallel, the image processing device may receive, from other processing devices, data corresponding to one or more adjacent parts of their own sub-image, that will overlap with parts of other sub-images when the entire image will be displayed by the display devices. These data are received via the interface 2061 with the source network 240. To that end, the image processing device 2100 may comprise an interface 2060 with a second network 250 similar to the cluster network 150 of FIG. 1a, connecting the different image processing devices together.

The received data from the cluster network 250 are also depacketized by the stream packetizer/depacketizer 2056.

Once depacketized, the adjacent parts and the sub-image are transmitted to a stream reader 2055 of the image processing device 2100, which merges them in order to constitute a clustered sub-image to be displayed by the associated display device 211, as explained with reference to FIG. 1a. The stream reader 2055 may use timestamps received with the sub-image and different adjacent parts respectively.

Then, once the local time reach the required value, the stream reader may transmit the clustered sub-image to the display device 211 using the output interface 2053, so as to project it synchronously with the other clustered sub-images.

In a particular embodiment, the image processing device 2100 may also include a synchronization manager 2059 configured to deliver a common time reference generated by a TDMA master device (not shown) of the source network 240. The common time reference may also be used by the stream reader 2055 to deliver the clustered sub-image to the display device 211 via the output interface 2053, in order to synchronize the display of the clustered sub-image with the display of the other clustered sub-images by the other display devices (not shown), as explained with reference to FIG. 1a.

The image processing device 2100 may be itself configured to send, via the cluster network 250, parts of its received sub-image that are adjacent to other sub-images received by other image processing devices (not shown) via the source network 240, and that constitute overlapping zones between these sub-images.

To that end, the stream reader 2055 may be further configured to transmit the sub-image received via the source network 240 to a cut-and-duplicate module 2052 that determines the adjacent parts to be sent to other image processing devices via the cluster network 250, based on the display scheme.

Once the pixels of the determined parts have been duplicated, they are transmitted to a stream builder 2054 that generates a stream, possibly including a timestamp based on the common time reference delivered by the synchronization manager 2059.

The stream is then transformed by the stream packetizer/depacketizer 2056 in a form adapted to its transmission on the cluster network 250, by an interface 2058.

Therefore, other image processing devices (not shown) receive the adjacent parts that constitute overlapping zones of their own sub-image, as described above for the image processing device 2100, so that they may merge them with their own sub-image in order to create the clustered sub-image (with zones that will overlap with other zones of other sub-images received by other image processing devices) that will be displayed by associated display devices (not shown) when permitted by the timestamp.

It is to be noted that the image processing device 2100 only manages parts of its own sub-image (and not of the other sub-images) that may be displayed also by other image processing devices as overlapping zones.

Therefore, the calculation of overlapping zones is distributed among the different image processing devices of the cluster network 250 and not performed in one and a same module, as done in the state of the art.

The module 2054 of the cluster device 2050 and the module 2054 of the image processing device 2100 are performing the same function. The steps respectively implemented in the cluster device 2050 and in the image processing device 2100 are performed concurrently according to their respective network (i.e. the source network and the cluster network).

In practice, the modules 2054 and 2056 are integrated. In other words, they are able to handle simultaneously multiple streams. In a particular embodiment, the interfaces 2058 and 2061 may be the same.

FIG. 3 shows general steps of a method of processing a source image received from a source device (e.g. source device 100 of FIG. 1a or 200 of FIG. 2) via a first network (e.g. source network 140 of FIG. 1a or source network 240 of FIG. 2), to be displayed by an MP system as a full image (e.g. image 130 of FIGS. 1a and 1b), according to some embodiments of the present invention.

These steps may be implemented in a cutting device as described with reference to FIG. 1a (cutting device 101). This cutting device may also be comprised in an image processing system as described with reference to FIG. 2 (cutting device 2050 in image processing system 2000).

The process starts here at step 300 when the cutting device receives the source image from the source device.

At step 302, the cutting device splits the source image received from the source device into a plurality of sub-images, according to a composite display scheme (splitting process), without performing any duplication of pixels.

As explained above, the image may be cut up into a number of sub-images equal to the number of display devices of the MP system.

At step 304, the cutting device may generate a timestamp corresponding to the time when the first pixel of the source image is received from the source device. As explained above, this timestamp is computed based on a common time reference transmitted over the source network.

At step 306, the cutting device generates and transmits sub-streams to image processing devices similar to those described with reference to FIG. 1a or FIG. 2, over the source network. Each sub-stream includes a respective sub-image to be displayed and may also include the above-mentioned timestamp.

The process may then comprise a test 308 that determines if there is a change in the composite display scheme of the MP system.

This may occur for instance when the number of display devices has changed or one of the display devices has been moved, or when the resolution has been modified. If the composite display scheme has changed, a step 310 of computing the new splitting process to apply based on the new composite display scheme may be performed, so that when another source image is received from the source device at step 300, the splitting process applied to the new image at step 302 is in conformity with the new composite display scheme.

If no change occurred in the composite display scheme, the splitting process is not recomputed and a further image will be split (new step 302) according to the same composite display scheme.

FIG. 4 shows general steps of a method of processing a sub-image (e.g. 131 or 132 of FIG. 1a or 1b) of a source image split into a plurality of sub-images according to a composite display scheme, each to be displayed by a display device (e.g. display devices 111, 113 of FIG. 1a, or display device 211 of FIG. 2), according to embodiments of the present invention.

The method may be implemented at an image processing device (e.g. 102 or 103 of FIG. 1a or 2100 of FIG. 2). The image processing device may be part of an image processing system (e.g. 2000) as described with reference to FIG. 2.

In some embodiments, the image processing device is configured to perform steps 400 to 440.

In some embodiments, the image processing device is configured to perform steps 400, 415 and 450 to 470.

In some embodiments, the MP system comprises a plurality of image processing devices, some of them being configured to perform steps 400 to 440, and other image processing devices being configured to perform steps 400, 415 and 450 to 470.

The composite display scheme may designate which image processing devices may perform which steps.

The method starts here at step 400, when the image processing device receives a sub-image to be displayed by its associated display device, via a first network (e.g. source network 140 of FIG. 1a or source network 240 of FIG. 2). The sub-image corresponds for example to one of the sub-images transmitted in the sub-streams by the cutting device, as described with reference to FIG. 3.

At step 410, adjacent part(s) of the sub-image that belong to other sub-images to be displayed by other display devices associated with other image processing device(s) are received by the image processing device implementing this algorithm.

At step 415, the received sub-image may be processed so as to determine part(s) of it, that is(are) adjacent to other sub-image(s) that may be received by other image processing device(s).

At optional step 420, the adjacent part(s) received at step 410 and/or determined at step 415 may be processed in order to adapt their intensity, given that these parts will overlap with other parts of other sub-images when be displayed and so will be displayed several times (see description of FIG. 1*a*).

At step 430, the image processing device merges the received overlapping zone(s) (and which optionally may have been processed at optional step 420) with the sub-image received at step 400, of which some parts determined at step 415 may have been processed at step 420.

At step 440, the clustered sub-image obtained at step 430 is sent to the display device. This step may employ a time counter, and may be based on the value of a local time and on a timestamp received with the sub-image via the source network, as explained with reference to FIG. 1*a*.

Then, at step 450, the part(s) of the sub-image determined at step 415, are duplicated and optionally processed at optional step 460 (similar to optional step 420) in order to adapt their intensity, given that these parts are overlapping zones that will be displayed several times (see description of FIG. 1*a*).

It is to be noted that that processing may be performed either in the image processing device receiving the adjacent parts (step 420) or in the image processing device duplicating the adjacent parts (step 460) before sending it to the image processing device(s) concerned at step 470.

Although the present invention has been described hereinabove with reference to specific embodiments, the present invention is not limited to the specific embodiments, and modifications which lie within the scope of the present invention will be apparent to a person skilled in the art.

Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. An image processing device, for a multi-display system, to process a first sub-image of an image split into a plurality of sub-images according to a display scheme, wherein each of the plurality of sub-images is configured to be displayed by a display device, wherein the image processing device is associated with a first display device and is configured to be connected to a source device through a first network and to at least one other image processing device through a second network, the image processing device comprising:

at least one processor that operates to:

receive the first sub-image from the source device via the first network;

receive, from the at least one other image processing device via the second network, at least one part of at least one second sub-image to be displayed by another display device associated with the at least one other image processing device; and generate a first clustered sub-image to be displayed by the first display device, the first clustered sub-image comprising the received first sub-image and the at least one received part being merged and appended along a common edge or border such that the first clustered sub-image is larger than the received first sub-image, wherein the at least one part of the at least one second sub-image is adjacent and connected to the first sub-image before the image is split into the plurality of sub-images and after the first clustered sub-image is generated, and the at least one part of the at least one second sub-image is separated from the first sub-image after the image is split and before the first clustered sub-image is generated, wherein the first clustered sub-image is displayed by the first display device such that at least a portion of the displayed first clustered sub-image overlaps with at least a portion of at least one second clustered sub-image being displayed by the another display device associated with the at least one other image processing device, the at least one second clustered sub-image comprising the at least one second sub-image and at least one part of the first sub-image being merged and appended along a common edge or border such that the at least one second clustered sub-image is larger than the at least one second sub-image, and wherein the at least one second clustered sub-image is generated at the at least one other image processing device.

2. An image processing device to process a first sub-image of an image split into a plurality of sub-images according to a display scheme, wherein each of the plurality of sub-images is configured to be displayed by a display device, wherein the image processing device is associated with a first display device and is configured to be connected to a source device through a first network and to at least one other image processing device through a second network, the image processing device comprising:

at least one processor that operates to:

receive the first sub-image from a source device via the first network;

determine at least one part of the received first sub-image, wherein the at least one part is adjacent to at least one second sub-image received by the at least one other image processing device; and send, via the second network, the at least one determined part to the at least one other image processing device for inclusion as a part of a second clustered sub-image to be displayed by a display device associated with the at least one other image processing device, the second clustered sub-image comprising the at least one part and the at least one second sub-image being merged and appended along a common edge or border such that the second clustered sub-image is larger than the received second sub-image, wherein the at least one part of the first sub-image is adjacent and connected to the at least one second sub-image before the image is split into the plurality of sub-images and after the second clustered sub-image is generated, and the at least one part of the first sub-image is separated from the at least one second sub-image after the image is split and before the second clustered sub-image is generated, wherein a first clustered sub-image is displayed by the first display device such that at least a portion of the displayed first clustered sub-image overlaps with at least a portion of the second clustered sub-image, the second clustered sub-image being displayed by the display device associated with the at least one other image processing device, the first clustered sub-image comprising the received first sub-image and at least one part of the second sub-image being merged and appended along a common edge or border such that the first clustered sub-image is larger than the received first sub-image, and wherein the first clustered sub-image is generated at the image processing device and the second clustered sub-image is generated at the at least one other image processing device.

3. The image processing device according to claim 1, wherein the at least one processor is further configured to receive a first timestamp for the first sub-image received from the source device, and wherein the at least one processor is further configured to receive at least one second timestamp for the at least one received adjacent part from the at least one other image processing device.

4. The image processing device according to claim 2, wherein the at least one processor is further configured to send, to the at least one other image processing device, a timestamp for the at least one determined part.

5. An image processing system, for a multi-display system, to process an image received from a source device, wherein the image is to be displayed by an array of display devices, the image processing system comprising:
at least one processor that operates to:
split the image received from the source device into a plurality of sub-images according to a display scheme; and
send each sub-image, via a first network, to a different image processing device according to claim 2.

6. The image processing system according to claim 5, wherein the display scheme may be composed of sub-images of the same size.

7. The image processing system according to claim 5, wherein the display scheme may be composed of sub-images of different size.

8. The image processing system according to claim 5, wherein the at least one processor is further configured to generate a timestamp for each sub-image and to send the timestamp with the sub-image.

9. A method for an image processing device, for a multi-display system, to process a first sub-image of an image split into a plurality of sub-images according to a display scheme, wherein each of the plurality of sub-images is configured to be displayed by a display device, wherein the image processing device is associated with a first display device and is configured to be connected to a source device through a first network and to at least one other image processing device through a second network, the method comprising:
receiving the first sub-image from the source device via the first network;
receiving, from the at least one other image processing device via the second network, at least one part of at least one second sub-image to be displayed by another display device associated with the at least one other image processing device; and
generating a first clustered sub-image to be displayed by the first display device, the first clustered sub-image comprising the received first sub-image and the at least one received adjacent part being merged and appended along a common edge or border such that the first clustered sub-image is larger than the received first sub-image, wherein the at least one part of the at least one second sub-image is adjacent and connected to the first sub-image before the image is split into the plurality of sub-images and after the first clustered sub-image is generated, and the at least one part of the at least one second sub-image is separated from the first sub-image after the image is split and before the first clustered sub-image is generated, wherein the first clustered sub-image is displayed by the first display device such that at least a portion of the displayed first clustered sub-image overlaps with at least a portion of at least one second clustered sub-image being displayed by the another display device associated with the at least one other image processing device, the at least one second clustered sub-image comprising the at least one second sub-image and at least one part of the first sub-image being merged and appended along a common edge or border such that the at least one second clustered sub-image is larger than the at least one second sub-image, and wherein the at least one second clustered sub-image is generated at the at least one other image processing device.

10. A method for an image processing device to process a first sub-image of an image split into a plurality of sub-images according to a display scheme, wherein each of the plurality of sub-images is configured to be displayed by a display device, wherein the image processing device is associated with a first display device and is configured to be connected to a source device through a first network and to at least one other image processing device through a second network, the method comprising:
receiving the first sub-image from a source device via the first network;
determining at least one part of the received first sub-image, wherein the at least one part is adjacent to at least one second sub-image received by the at least one other image processing device; and
sending, via the second network, the at least one determined part to the at least one other image processing device for inclusion as a part of a second clustered sub-image to be displayed by a display device associated with the at least one other image processing device, the second clustered sub-image comprising the at least one adjacent part and the at least one second sub-image being merged and appended along a common edge or border such that the second clustered sub-image is larger than the received second sub-image, wherein the at least one part of the first sub-image is adjacent and connected to the at least one second sub-image before the image is split into the plurality of sub-images and after the second clustered sub-image is generated, and the at least one part of the first sub-image is separated from the at least one second sub-image after the image is split and before the second clustered sub-image is generated, wherein a first clustered sub-image is displayed by the first display device such that at least a portion of the displayed first clustered sub-image overlaps with at least a portion of the second clustered sub-image, the second clustered sub-image being displayed by the display device associated with the second processing device, the first clustered sub-image comprising the received first sub-image and at least one part of the second sub-image being merged and appended along a common edge or border such that the first clustered sub-image is larger than the received first sub-image, and wherein the first clustered sub-image is generated at the image processing device and the second clustered sub-image is generated at the at least one other image processing device.

11. A method for an image processing system, for a multi-display system, to process an image received from a source device, wherein the image is to be displayed by an array of display devices, the method comprising:

splitting the image received from the source device into a plurality of sub-images according to a display scheme; and sending each sub-image, via a first network, to a different image processing device for processing according to the method of claim 10.

12. A non-transitory computer-readable storage medium storing a program causing an image processing device to perform the method according to claim 9.

13. A non-transitory computer-readable storage medium storing a program causing an image processing device to perform the method according to claim 10.

14. The image processing device of claim 1, wherein the at least one part of the at least one second sub-image and the received first sub-image do not overlap when being merged to generate and define the first clustered sub-image, and the received first sub-image and the at least one second sub-image are each less than, or smaller than, the image.

15. The image processing device of claim 1, wherein the at least one part of the first sub-image is adjacent and connected to the at least one second sub-image before the image is split into the plurality of sub-images and after the at least one second clustered sub-image is generated, and the at least one part of the first sub-image is separated from the at least one second sub-image after the image is split and before the at least one second clustered sub-image is generated.

16. The image processing device of claim 2, wherein the at least one part of the received first sub-image and the at least one second sub-image do not overlap when being merged to define and form the second clustered sub-image, and the received first sub-image and the at least one second sub-image are each less than, or smaller than, the image.

17. The image processing device of claim 2, wherein the first sub-image is adjacent and connected to the at least one part of the second sub-image before the image is split into the plurality of sub-images and after the first clustered sub-image is generated, and the at least one part of the second sub-image is separated from the first sub-image after the image is split and before the first clustered sub-image is generated.

18. The method for an image processing device according to claim 9, wherein the at least one part of the at least one second sub-image and the received first sub-image do not overlap when being merged to generate and define the first clustered sub-image, and the received first sub-image and the at least one second sub-image are each less than, or smaller than, the image.

19. The method for an image processing device according to claim 9, wherein the at least one part of the first sub-image is adjacent and connected to the at least one second sub-image before the image is split into the plurality of sub-images and after the at least one second clustered sub-image is generated, and the at least one part of the first sub-image is separated from the at least one second sub-image after the image is split and before the at least one second clustered sub-image is generated.

20. The method for an image processing device according to claim 10, wherein the at least one part of the received first sub-image and the at least one second sub-image do not overlap when being merged to define and form the second clustered sub-image, and the received first sub-image and the at least one second sub-image are each less than, or smaller than, the image.

21. The method for an image processing device according to claim 10, wherein the first sub-image is adjacent and connected to the at least one part of the second sub-image before the image is split into the plurality of sub-images and after the first clustered sub-image is generated, and the at least one part of the second sub-image is separated from the first sub-image after the image is split and before the first clustered sub-image is generated.

22. The image processing device of claim 15, wherein the overlapping and superposition of the portion of the displayed first clustered sub-image with the portion of the at least one second clustered sub-image is displayed smoothly such that an intensity of the overlapping portions is similar to an intensity of at least one of the first clustered sub-image and the at least one second clustered sub-image.

23. The image processing device of claim 17, wherein the overlapping and superposition of the portion of the displayed first clustered sub-image with the portion of the second clustered sub-image is displayed smoothly such that an intensity of the overlapping portions is similar to an intensity of at least one of the first clustered sub-image and the second clustered sub-image.

24. The method for an image processing device according to claim 19, wherein the overlapping and superposition of the portion of the displayed first clustered sub-image with the portion of the at least one second clustered sub-image is displayed smoothly such that an intensity of the overlapping portions is similar to an intensity of at least one of the first clustered sub-image and the at least one second clustered sub-image.

25. The method for an image processing device according to claim 21, wherein the overlapping and superposition of the portion of the displayed first clustered sub-image with the portion of the second clustered sub-image is displayed smoothly such that an intensity of the overlapping portions is similar to an intensity of at least one of the first clustered sub-image and the second clustered sub-image.

26. The image processing device of claim 1, wherein at least one of: (i) the first clustered sub-image includes the received first sub-image and the at least one received part of only one second sub-image; and (ii) the at least one second sub-image comprises only one second sub-image.

27. The image processing device of claim 2, wherein the at least one second sub-image comprises only one second sub-image.

28. The method for an image processing device according to claim 9, wherein at least one of: (i) the first clustered sub-image includes the received first sub-image and the at least one received part of only one second sub-image; and
(ii) the at least one second sub-image comprises only one second sub-image.

29. The method for an image processing device according to claim 10, wherein the at least one second sub-image comprises only one second sub-image.

* * * * *